US010922062B2

(12) United States Patent
Venka et al.

(10) Patent No.: US 10,922,062 B2
(45) Date of Patent: Feb. 16, 2021

(54) SOFTWARE APPLICATION OPTIMIZATION

(71) Applicant: salesforce.com, inc., San Francisco, CA (US)

(72) Inventors: Laksh Venka, San Francisco, CA (US); Brian Toal, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 8 days.

(21) Appl. No.: 16/384,651

(22) Filed: Apr. 15, 2019

(65) Prior Publication Data
US 2020/0326918 A1    Oct. 15, 2020

(51) Int. Cl.
G06F 9/44    (2018.01)
G06F 8/41    (2018.01)

(52) U.S. Cl.
CPC .................. G06F 8/4443 (2013.01)

(58) Field of Classification Search
CPC .................................... G06F 8/4443
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,133 | B1 | 4/2001 | Masthoff |
| 6,216,135 | B1 | 4/2001 | Brodersen et al. |
| 6,233,617 | B1 | 5/2001 | Rothwein et al. |
| 6,236,978 | B1 | 5/2001 | Tuzhilin |
| 6,266,669 | B1 | 7/2001 | Brodersen et al. |
| 6,288,717 | B1 | 9/2001 | Dunkle |
| 6,289,506 | B1 * | 9/2001 | Kwong ............... G06F 9/45516 717/148 |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| 6,336,213 | B1 * | 1/2002 | Beadle ............... G06F 9/45516 717/118 |
| D454,139 | S | 3/2002 | Feldcamp et al. |

(Continued)

OTHER PUBLICATIONS

"Google Plus Users", Google+Ripples; Oct. 31, 2011; 3 pages.

(Continued)

*Primary Examiner* — Hang Pan
(74) *Attorney, Agent, or Firm* — Schwabe Williamson & Wyatt

(57) ABSTRACT

Embodiments of the present disclosure relate to software application optimization. Other embodiments may be described and/or claimed.

18 Claims, 4 Drawing Sheets

(56) References Cited

U.S. PATENT DOCUMENTS

| | | |
|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,103,760 B2 | 1/2012 | Reedy |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,442,727 B2 | 9/2016 | Chou |
| 10,175,964 B2 | 1/2019 | Radigan |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0073904 A1* | 4/2004 | Hill ............... G06F 9/45516 718/1 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0228936 A1 | 10/2005 | Kuo |
| 2006/0143350 A1 | 6/2006 | Miloushev |
| 2007/0226717 A1 | 9/2007 | Shtilman |
| 2008/0177756 A1 | 7/2008 | Kosche et al. |
| 2008/0249972 A1 | 10/2008 | Dillon |
| 2009/0063415 A1 | 3/2009 | Chatfield |
| 2009/0100342 A1 | 4/2009 | Jakobson |
| 2009/0157359 A1 | 6/2009 | Chernoff |
| 2009/0177744 A1 | 7/2009 | Marlow et al. |
| 2010/0122260 A1* | 5/2010 | Kawachiya ......... G06F 9/3851 718/103 |
| 2011/0218958 A1 | 9/2011 | Warshavsky |
| 2011/0247051 A1 | 10/2011 | Bulumulla |

(56) References Cited

U.S. PATENT DOCUMENTS

| | | |
|---|---|---|
| 2011/0321019 A1 | 12/2011 | Gibbons |
| 2012/0042218 A1 | 2/2012 | Cinarkaya |
| 2012/0072656 A1 | 3/2012 | Archak |
| 2012/0159460 A1* | 6/2012 | Haug ............... G06F 8/443 717/139 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0068343 A1 | 3/2014 | Nakajima |
| 2014/0359537 A1 | 12/2014 | Jackobson et al. |
| 2015/0074668 A1 | 3/2015 | Burka |
| 2015/0234652 A1 | 8/2015 | Naveh |
| 2016/0004582 A1 | 1/2016 | Nagura |
| 2016/0080368 A1 | 3/2016 | Heurich |
| 2016/0330067 A1 | 11/2016 | Liu |
| 2016/0378583 A1 | 12/2016 | Nakano |
| 2017/0068603 A1 | 3/2017 | Tai |
| 2017/0132026 A1 | 5/2017 | Zang |
| 2017/0371766 A1 | 12/2017 | Gadi |
| 2018/0027058 A1 | 1/2018 | Balle |
| 2018/0121103 A1 | 5/2018 | Kavanagh |
| 2018/0177756 A1 | 6/2018 | Christopher et al. |
| 2018/0300067 A1 | 10/2018 | Mittal |
| 2018/0324030 A1 | 11/2018 | Dang |

OTHER PUBLICATIONS

Breigand et al., Automated Adaptive Threshold Setting: Enabling Technology for Autonomy and Self-Management, IEEE, 2005, retrieved on-line on Jul. 1, 2020, pp. 1-12; Retreived from Internet: https://ieeexplore.ieee.org/stamp/stamp.jsp?tp=&arnumber=1498065 (2005).

Yang, Yan and Eric Williams, "Logistic Model-Based Forecast of Sales and Generation of Obsolete Computers in the US." Technological Forecasting and Social Change 76.8 (2009); pp. 1105-1114.

Guzman, Javier Garcia, et al. "Practical Experiences in Modelling Software Engineering Practices: The Project Patterns Approach"; Software Quality Journal 21.2 (2013); pp. 325-354.

Garcia, Javier, et al. "Design Guidelines for Software Processes Knowledge Repository Development" Information and Software Technology 53.8 (2011); pp. 834-850.

Mshelk et al. "CoMet: A Tool Using CUMM to Measure Unused Component Member" IEEE International Conference on Computer Systems and Applications (2006) Dubai, UAE, pp. 697-703.

Luo et al., "VertexRank: Importance Rank for Software Network Vertices" 2014 IEEE 38th Annual Computer Software and Applications Conference, Vasteras (2014); pp. 251-260.

Dubois et al., "Autonomic Provisioning and Application Mapping on Spot Cloud Resources" (2015) International Conference on Cloud and Autonomic Computing, Boston MA, pp. 57-68.

Alzami, Z., "Application of Redundant Computation in Program Debugging" Journal of Systems and Software, 81.11 (2008); pp. 2024-2033.

Pistoria et al. "A survey of Static Analysis Methods for Identifying Security Vulnerabilities in Software Systems"; IBM Systems Journal; 46.2 (2007); pp. 265-288.

Cho et al., "Redundancy Identification/Removal and Test Generation for Sequential Circuits Using Implicit State Enumeration", IEEE Transactions on Computer-Aided Design of Integrated Circuits and Systems; 12.7 (1993); pp. 935-945.

Cito Jurgen, "Software Runtime Analytics for Development: Extending Developer's Mental Models by Runtime Dimensions" Dissertation, Zurich, Feb. 2018; p. 216.

* cited by examiner

SOFTWARE APPLICATION OPTIMIZATION

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

Embodiments of the present disclosure relate to software application optimization. Other embodiments may be described and/or claimed.

BACKGROUND

In many software applications, the performance of the application is dependent on the manner in which the application is compiled. For example, in Java Virtual Machine (JVM)-based runtimes that use just-in-time (JIT) compilation, the performance of various features associated with underlying code is dependent on whether code is running compiled or interpreted. In such cases, the performance of the compiled code may further depend on its compilation tier and/or compilation level within a tier.

Among other things, embodiments of the present disclosure help identify code of a software application (e.g., running interpreted or compiled at lower compilation tiers) that can be compiled (or complied at a higher level) to improve speed and efficiency of the application.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for optimizing software applications.

I. System Examples

Figure 1A:
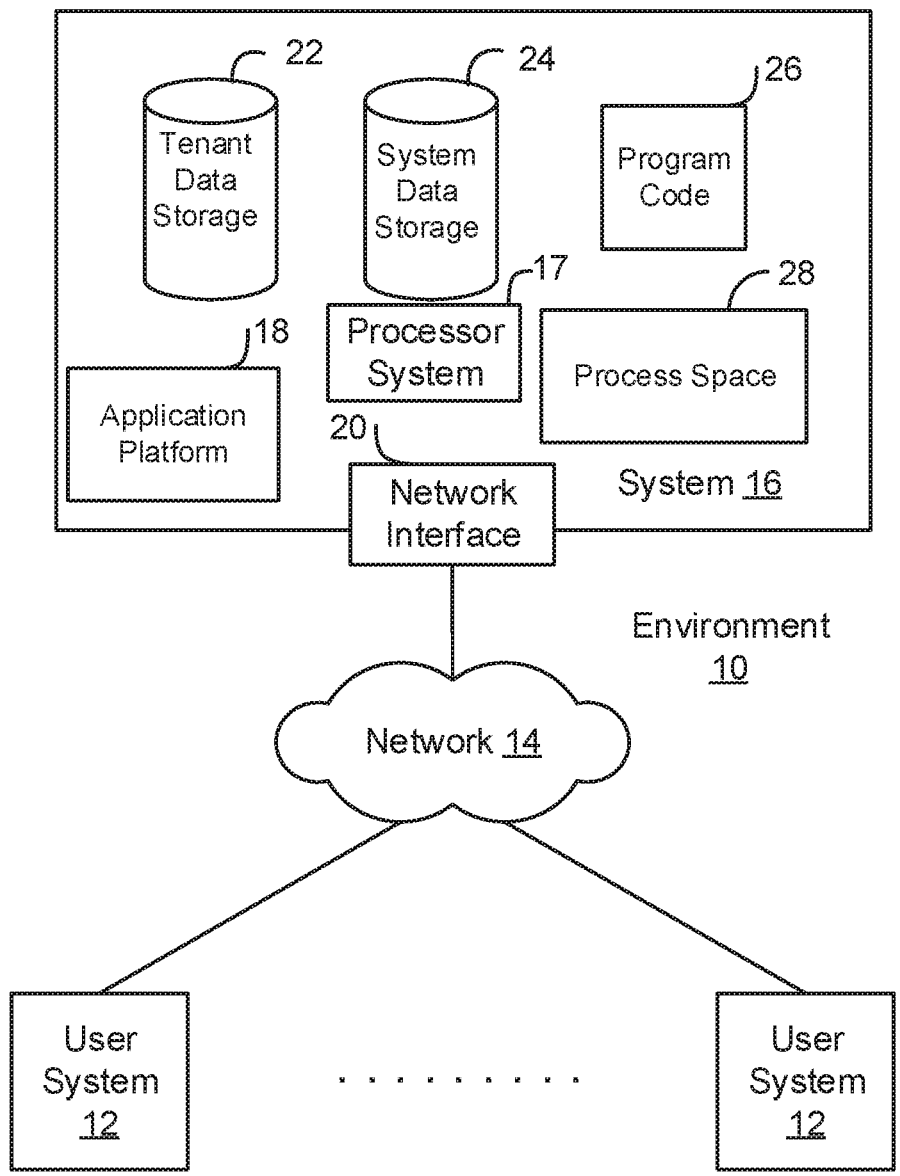
FIG. 1A is a block diagram illustrating an example of an environment in which an on-demand database service can be used according to various embodiments of the present disclosure.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED)

display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
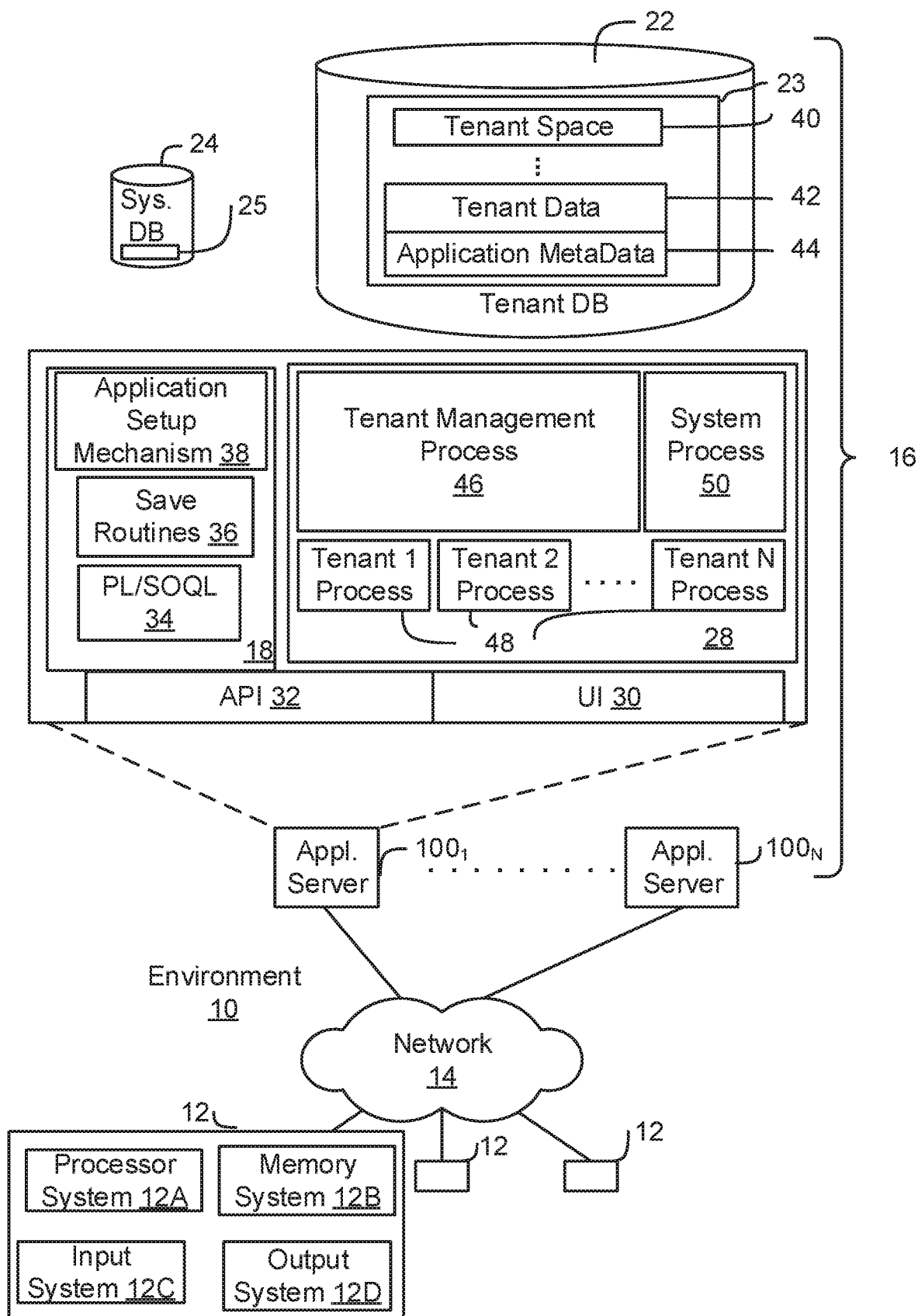
FIG. 1B is a block diagram illustrating examples of implementations of elements of FIG. 1A and examples of interconnections between these elements according to various embodiments of the present disclosure.

FIG. 1B shows a block diagram with examples of implementations of elements of FIG. 1A and examples of interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example of a storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of an MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Software Application Optimization

Embodiments of the present disclosure may be used to monitor the performance of a software application to identify portions of the application (and the underlying code) that can be optimized to improve the performance of the application. In some embodiments, for example, the system monitors JVM call stacks which (on each frame) include metadata about whether the frame has been compiled, and (if so) at what level of compilation.

In the example of JVM applications, code can be run in an interpreted state where the code is interpreted by a just-in-time (JIT) compiler, or the code can be compiled at different tiers (e.g., 1, 2, . . . n) and at different levels within a tier. In general, interpreted code tends to run more slowly than compiled code, and code compiled at a relatively higher tier (e.g., tier 4) runs more quickly than code compiled at a relatively lower tier (e.g., tier 1).

Traditional compilers (such as the JIT compiler in JVM) use profile guided optimization techniques to optimize an application. Typically, code that is "hot" (i.e., where a lot of CPU time is spent) should get compiled at the highest compilation tier, but methods can get de-optimized for a number of reasons and, as a consequence, end up running interpreted or at a lower compilation tier. As a result, many software applications may run less quickly and efficiently than they would if such code were properly optimized.

Embodiments of the present disclosure may be utilized to find the "hot" methods (where CPU time is being spent) but that are not compiled at the higher compilation tiers. Embodiments of the present disclosure can also identify other optimization opportunities, such as identifying code for inlining (a compiler optimization where, for example, a function call is replaced with the body of the called function). Inlining code for a method may help improve the speed and efficiency of the application even when the methods is otherwise compiled at the highest compilation tier.

In some embodiments, the JVM is modified to include the compiled state metadata per frame of a software application when the call stack of the application is returned. As described in more detail below, the system can analyze the portions (e.g., methods) of the software application to determine, for example, whether all methods are being compiled at the highest compilation tiers (since it may be wasteful to compile methods which do not consume many CPU cycles at the highest compilation tier), as well as whether there are methods compiled at lower tiers that should be compiled at a higher tier to improve the efficiency of the application.

Figure 2:
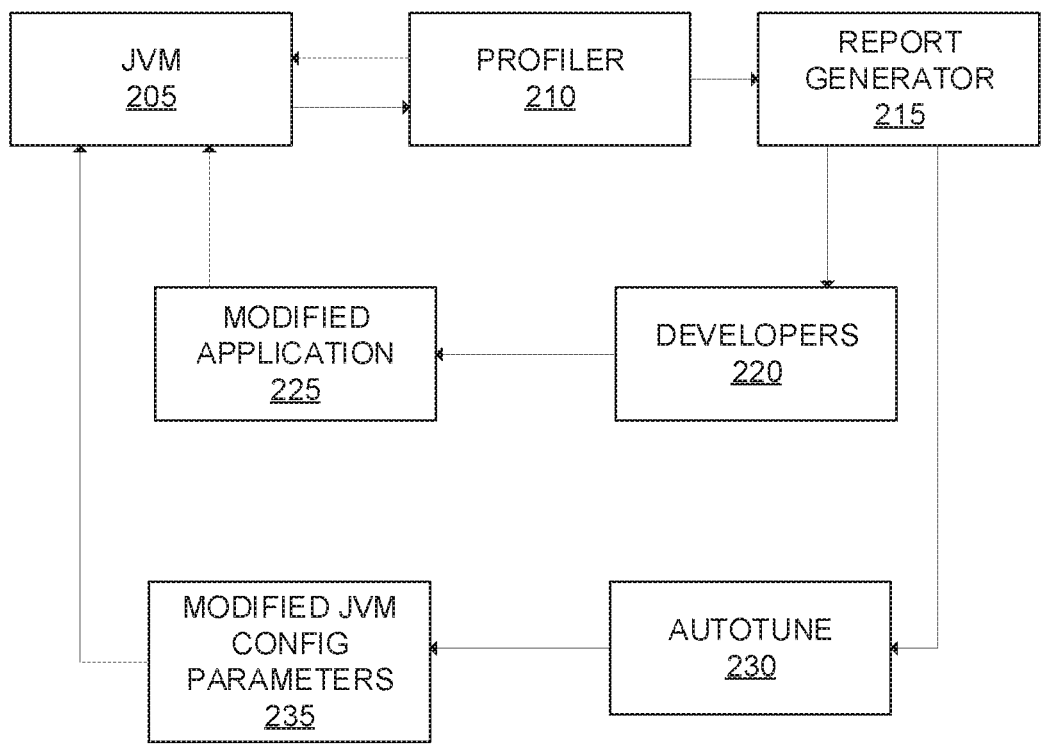
FIG. 2 is a block diagram illustrating an example of components of a software application optimization system according to various aspects of the present disclosure.

FIG. 2 is a block diagram illustrating an example of components of a software application optimization system according to various embodiments. In this example, the JVM component 205 is a Java Virtual Machine component to run applications written in Java and other languages that can be run using Java bytecodes. The profiler 210 is an agent that periodically samples or traces execution paths by sending signals or calling an application program interface (API) in the JVM 205. The JVM 205 then sends information about thread stacks to the profiler 210. In alternate embodiments, the profiler 210 may be an embedded agent in the JVM 205.

The profiler 210 sends the information about the thread stacks to a report generator 215, which generates a report including, for example, information on hot methods (i.e., methods where considerable CPU time is spent) and metadata on compilation levels and optimizations. In some embodiments, the report generator 215 may be embedded as a component within the profiler 210.

The report generator 215 may transmit a report in a variety of different formats to a variety of different systems and individuals. In the example shown in FIG. 2, the report generator provides a report (e.g., in a text format) to software developers 220 (e.g., individuals or groups who generated the code or who otherwise have the ability or responsibility to modify the application run on the JVM. The developers can modify the application based on the report generated to help the JVM JIT compilers to compile hot code in the application at the highest compilation tiers.

The report generator 215 may also provide a report (e.g., in a machine-readable format) to the autotune component 230. The autotune component 230 automatically tunes JVM configuration parameters based on impact to the application's runtime. The autotune component 230 would find optimal values for JVM configuration parameters based on input from the report generated.

Figure 3:
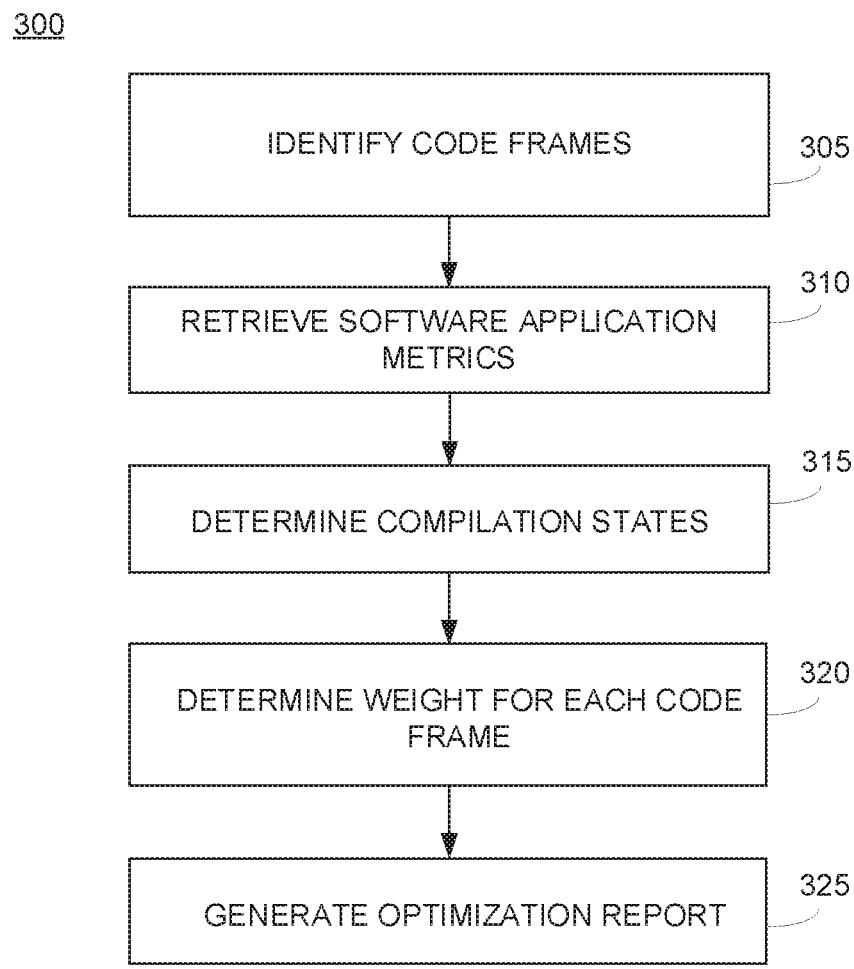
FIG. 3 is a flow diagram illustrating an example of a process according to various aspects of the present disclosure.

FIG. 3 is a flow diagram illustrating an example of a process 300 according to various aspects of the present disclosure. Any combination and/or subset of the elements of the methods depicted herein (including method 300 in FIG. 3) may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Process 300 includes identifying code frames for a software application (305), retrieving a set of metrics collected for the software application (310), determining, based on the metrics, a compilation state for each code frame (315), determining a respective weight associated with the respective compilation state for each respective code frame (320), and generating an optimization report (325).

A computer system (e.g., implemented by system 16 illustrated in FIGS. 1A and 1B) may perform the operations of the processes described herein, including the processes shown in FIG. 3. Computer system 16 may perform portions of such processes alone, or in conjunction with other systems (e.g., by exchanging electronic communications over network 14 with a user system 12 or other device).

In some embodiments, code frames for a software application may be identified (305) by analyzing code frames in thread stacks associated with the application. In some embodiments, the frames in the thread stacks are annotated to capture the compiled state metadata. For example, in the OpenJDK HotSpot implementation of the JVM, this can achieved by modifying the stack frame associated with each method to record the compilation information for those methods.

In a particular example, consider a software application A comprising: (1) class Foo with methods a, b, c; (2) class Bar with methods x, y, z; and (3) thread Baz which runs code from Foo and Bar. In this example, application A starts thread Baz, while runtime R hosts application A and profile profiler P acquires metrics such as CPU usage and profiling data for the application. In some embodiments, the metrics may include an amount of processor execution time for a thread of the software application, and/or a latency associated with a thread of the software application.

In this example, an example of a stack trace (ST1) for Thread Baz is shown as follows:

"Thread-Baz" id=100 in RUNNABLE←Header with thread information
  at Foo.c (Foo.java:100) [i]←Stack frame
  at Foo.b (Foo.java:200) [c2(4)]
  at Foo.a (Foo.java:300) [c1(3)]
  at Bar.z (Bar.java:50) [c1(3)]

In the example of the stack trace above, the stack frame format is: at <Class>.<method> (<Filename>:<line number>) [Metadata]. The Metadata section contains information about the compilation state (an interpreted state or a compiled state) for each respective method in the code frame. If compiled, the metadata further describes the enumerated compilation tiers and levels within the tiers. For example, the metadata in the example above is as follows: i—interpreted; c1—compilation tier 1; c2—compilation tier 2; c1(3)—tier 1 level 3; c2(4)—tier 2 level 4. In some embodiments, the metadata may include respective compilation information for each respective method associated with a code frame.

The system may retrieve the metrics (310) described in each frame of the stack trace, and determine (e.g., based on the metadata fields for each frame) the compilation state (315) for each respective code frame. In some embodiments, "hot" methods (as described above) can be identified by profiling stack traces either with periodic thread dumps or with a CPU profiler in order to identify methods that should be compiled at a higher compilation tier or tier level than they are currently compiled. For example, the system may analyze the output from a profiler to determine that 60% of the CPU time was recorded in method Foo.c, and also determine (based on the stack frame information shown previously) that Foo.c is running in the interpreter without any compiler optimizations.

Method calls have an overhead, and inlining is a compiler optimization that expands the body of the callee method in the caller. However, inlining large methods can cause code size to increase and cause instruction cache misses, which in turn may lead to a performance degradation. Traditional compilers include heuristics to inline methods that considers these factors, but an application may actually perform faster and more efficiently when larger code portions are inlined. Using conventional compilation techniques, however, such code will not be inlined by a compiler due to its size.

Continuing with the previous example, Foo.b calls Foo.c. Foo.c is a hot method and could be called frequently. The method call overhead can be reduced if Foo.c were to be inlined in Foo.b but the compiler heuristic may have decided that Foo.c was too big to inline.

In some embodiments, the system may determine weights (320) for the various code frames of an application and generate an optimization report (325) that identifies methods for frames that were too big to inline. From FIG. 2, a report may be provided to human developers 220 and software optimizers such as autotune 230 to manually inline a method and/or reduce the size of methods and change configuration values to influence the inlining heuristics to better suit the application.

In one example, an embodiment is used to identify opportunities to reduce CPU utilization of application A when hosted in runtime R. During the course of business hours, R is constantly sampled by profiler P. P captures metrics (310) such as CPU time per thread, as well as call stacks at some arbitrary interval. The captured samples are placed in to set S. Code frames may be identified (305), and their compilation state determined (310), based on the information in the call stacks.

At the end of a predetermined time period, the sample set S is analyzed to look for top-k code paths that were sampled most frequently from profiler output, PO1. A heuristic function is applied to assign weights for a combination of CPU percentage/sample counts and the frame compilation state (interpreted, C1 . . . Cn), where frames running interpreted would have a bigger weight than frames compiled with Cn.

The weight for a frame may be determined (320) according to a variety of different criteria. In one embodiment, determining the weight associated with the respective compilation state for a respective code frame is performed according to: Weight(CPU)*Weight(compilation tier)*Weight(compilation level). Where the weight for the compilation tier and level would go up at lower compilation tiers and levels and the weight for CPU would increase with an increasing percentage of CPU samples collected in those methods.

In another embodiment, the weight may be determined according to: Weight(CPU)=0.01 for each CPU sample percentage. Accordingly, if 60% of CPU samples were recorded in Foo.c, the CPU weight for Foo.c would be 0.6.

In another embodiment, the weight may be determined according to: Weight(compilation tier)=$10^{(n-tier)}$, where 'n' is the maximum number of compilation tiers available in the system. Consider a case where the maximum number of compilation tiers available is 2, then for interpreted code, which would be tier 0, the weight would be $10(2-0)=100$. For C1, which would be tier 1, the weight would be $10^{(2-1)}=10$. For C2, which would be tier 2, the weight would be $10^{(2-2)}=1$.

In another embodiment, the weight may be determined according to: Weight(compilation level within the tier)=(m-level)+1, where 'm' is the maximum compilation level within the tier. Consider a case where the interpreter has only 1 level and all compilation tiers have 4 levels within them. Then for interpreted code, the weight would be (1-1)+1=1. For C1/C2, level 1, the weight would be (4-1)+1=4. For C1/C2, level 4, the weight would be (4-4)+1=1.

The system may generate an optimization report (325) that includes a list of frames, sorted by weight, for potential optimization to reduce CPU consumption and latency. From the example profiler output, PO1, the weights would be calculated as follows:

Foo.c—CPU samples—60%, interpreted $$0.6*(10^{(2-0)})*((1-1)+1)=0.6*100*1=60$$

Foo.b—CPU samples—50%, c2(4)

$$0.5*(10^{(2-2)})*((4-4)+1)=0.5*1*1=0.5$$

Foo.a—CPU samples—50%, c1(3)

$$0.5*(10^{(2-1)})*((4-3)+1)=0.5*10*2=10$$

Bar.z—CPU samples—50%, c1(3)

$$0.5*(10^{(2-1)})*((4-3)+1)=0.5*10*2=10$$

Bar.y—CPU samples—20%, c1(3)

$$0.2*(10^{(2-1)})*((4-3)+1)=0.2*10*2=4$$

Bar.x—CPU samples—(10+20=30%), c1(3)

$$0.5*(10^{(2-1)})*((4-3)+1)=0.5*10*2=10$$

The sorted list would then produce the following output:
Foo.c—60
Foo.a—10

Bar.z—10
Bar.x—6
Bar.y—4
Foo.b—0.5

Based on the above output, either developers or a system like autotune could modify the method and/or the compiler parameters to get Foo.c compiled at higher compilation tiers and potentially improve the performance by orders of magnitude. Similarly, the report generator could also help surface a recommendation for developers to reduce the size of Foo.c, which did not get inlined due to its method size, so it can be inlined or adjust the inline code threshold in the compiler so bigger methods can get inlined.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
   a processor; and
   memory coupled to the processor and storing instructions that, when executed by the processor, cause the system to perform operations comprising:
   identifying a plurality of code frames for a software application;
   retrieving a set of metrics collected for the software application;
   determining, based on the set of metrics, a compilation state for each respective code frame;
   determining a respective weight associated with the respective compilation state for each respective code frame, wherein determining the respective weight for each respective code frame includes applying a function to assign the respective weight to the respective code frame based on a processor utilization metric associated with the respective code frame and the compilation state of the respective code frame, and wherein the compilation state for a code frame from the plurality of code frames is a compiled state having an enumerated tier and an enumerated level within the tier; and
   generating an optimization report comprising a list of the code frames and the respective weight for each code frame.

2. The system of claim 1, wherein the compilation state for a code frame from the plurality of code frames is an interpreted state or a compiled state.

3. The system of claim 1, wherein determining the compilation state for the code frames includes analyzing respective metadata associated with each respective code frame.

4. The system of claim 3, wherein the metadata for a code frame includes respective compilation information for each respective method associated with the code frame.

5. The system of claim 1, wherein the set of metrics includes one or more of: an amount of processor execution time for a thread of the software application, and a latency associated with a thread of the software application.

6. The system of claim 1, wherein generating the optimization report includes identifying a portion of the software application that was not compiled inline due to a size of one or more methods associated with a code frame.

7. A tangible, non-transitory computer-readable medium storing instructions that, when executed by a computer system, cause the computer system to perform operations comprising:
   identifying a plurality of code frames for a software application;
   retrieving a set of metrics collected for the software application;
   determining, based on the set of metrics, a compilation state for each respective code frame;
   determining a respective weight associated with the respective compilation state for each respective code frame, wherein determining the respective weight for each respective code frame includes applying a function to assign the respective weight to the respective code frame based on a processor utilization metric associated with the respective code frame and the compilation state of the respective code frame, and wherein the compilation state for a code frame from the plurality of code frames is a compiled state having an enumerated tier and an enumerated level within the tier; and generating an optimization report comprising a list of the code frames and the respective weight for each code frame.

8. The tangible, non-transitory computer-readable medium of claim 7, wherein the compilation state for a code frame from the plurality of code frames is an interpreted state or a compiled state.

9. The tangible, non-transitory computer-readable medium of claim 7, wherein determining the compilation state for the code frames includes analyzing respective metadata associated with each respective code frame.

10. The tangible, non-transitory computer-readable medium of claim 9, wherein the metadata for a code frame includes respective compilation information for each respective method associated with the code frame.

11. The tangible, non-transitory computer-readable medium of claim 7, wherein the set of metrics includes one or more of: an amount of processor execution time for a thread of the software application, and a latency associated with a thread of the software application.

12. The tangible, non-transitory computer-readable medium of claim 7, wherein generating the optimization report includes identifying a portion of the software application that was not compiled inline due to a size of one or more methods associated with a code frame.

13. A method comprising:
identifying, by a computer system, a plurality of code frames for a software application;
retrieving, by the computer system, a set of metrics collected for the software application;
determining, by the computer system based on the set of metrics, a compilation state for each respective code frame;
determining, by the computer system, a respective weight associated with the respective compilation state for each respective code frame, wherein determining the respective weight for each respective code frame includes applying a function to assign the respective weight to the respective code frame based on a processor utilization metric associated with the respective code frame and the compilation state of the respective code frame, and wherein the compilation state for a code frame from the plurality of code frames is a compiled state having an enumerated tier and an enumerated level within the tier; and
generating, by the computer system, an optimization report comprising a list of the code frames and the respective weight for each code frame.

14. The method of claim 13, wherein the compilation state for a code frame from the plurality of code frames is an interpreted state or a compiled state.

15. The method of claim 13, wherein determining the compilation state for the code frames includes analyzing respective metadata associated with each respective code frame.

16. The method of claim 15, wherein the metadata for a code frame includes respective compilation information for each respective method associated with the code frame.

17. The method of claim 13, wherein the set of metrics includes one or more of: an amount of processor execution time for a thread of the software application, and a latency associated with a thread of the software application.

18. The method of claim 13, wherein generating the optimization report includes identifying a portion of the software application that was not compiled inline due to a size of one or more methods associated with a code frame.

* * * * *